Sept. 23, 1952 J. G. CAPSTAFF 2,611,686
APPARATUS FOR TRANSFERRING AN EMULSION
LAYER FROM A PERFORATED FILM STRIP
Filed Feb. 17, 1948 4 Sheets-Sheet 1

JOHN G. CAPSTAFF
INVENTOR

BY Newton M. Ferriss
Frank R. Gollon
ATTORNEYS

Sept. 23, 1952   J. G. CAPSTAFF   2,611,686
APPARATUS FOR TRANSFERRING AN EMULSION
LAYER FROM A PERFORATED FILM STRIP
Filed Feb. 17, 1948   4 Sheets-Sheet 3

JOHN G. CAPSTAFF
INVENTOR

BY Frank R. Gollon
ATTORNEYS

Patented Sept. 23, 1952

2,611,686

UNITED STATES PATENT OFFICE 2,611,686

APPARATUS FOR TRANSFERRING AN EMULSION LAYER FROM A PERFORATED FILM STRIP

John G. Capstaff, Rochester, N. Y., assignor to Eastman Kodak Company, Rochester, N. Y., a corporation of New Jersey Application February 17, 1948, Serial No. 8,864

28 Claims. (Cl. 41—1)

The present invention relates to a photographic apparatus and more particularly to an improved apparatus for transferring emulsion layers from a multilayer motion picture film to separate film bases. The present invention constitutes an improvement over that disclosed in United States Letters Patent No. 2,417,060, granted to me March 11, 1947.

It is necessary that the successive transfer of exposed emulsion layers from a multilayer film to separate film bases or supports be done in such a manner that each point in the latent picture area bears precisely the same relationship to the sprocket holes of the new film as it bore to the sprocket holes of the multilayer film. This is particularly true in color photography. After each of the strippable color emulsions has been transferred to a separate support, thus producing separate lengths of film, the picture areas must be in exact registry when the perforations of these separate lengths of film are brought into registry. This holds true whether the color separation films are being used to produce positive color prints photographically, by imbibition, or by any other known color printing process.

In the apparatus disclosed in my Patent 2,417,060, the exposed multilayer film and the unsensitized film support are first brought into registration by passing the two over a braked idler sprocket after which the superposed films are passed through a roll down which brings the films into intimate contact. Inasmuch as the roll down, which consists of a pair of pressure rollers, usually disturbs the registry slightly, the superposed films are then passed over a second sprocket to bring the perforations into exact and final registration. I have found, however, that considerably improved results are obtainable if the films are rolled down just prior to their being engaged by a first sprocket which registers the films. This sprocket is positively driven and effects registration of the superposed films immediately after they are brought into intimate contact by passage between the pressure rollers. In addition to improving registration, this arrangement eliminates the use of a registering sprocket prior to the roll down as employed in my prior invention.

Another improvement over my prior invention results from the arrangement of the sprockets. In my Patent 2,417,060 the first sprocket that engages the superposed films is braked, the second being weakly frictionally or tendency driven and the third positively driven. This tends to maintain the films under tension and aids in holding the films in registration during the bonding period after the roll down operation. In the present invention, a coacting sprocket and roller are positively driven and a second coacting sprocket and roller are driven by a friction or tendency drive which tends to operate at a higher rate of speed to maintain the films under tension. This arrangement, I have found, effects a more precise and continuous registration of the films in the critical bonding period which occurs immediately after the roll down. An intermediate idler sprocket and roller may be employed to preclude any lateral movement of the films during their travel between the first and second sprockets and their coacting rollers.

I have also found that although the critical period in the bonding of the transfer film to the multilayer film occurs while the films travel between the positively driven coacting sprocket and roller and this first tendency driven coacting sprocket and roller, the adhesion of the two films is not complete and continues to develop after they pass between the latter tendency driven elements. I, therefore, provide a second tendency driven sprocket and roller, similar to the first, well along the path of the films from the first of the tendency driven elements to the station at which the top emulsion layer is stripped with the transfer film from the multilayer film. By such means the superposed films continue to be maintained under tension for a space of time after the initial critical bonding period and the initial registration is preserved while the bonding is reaching completion.

Since the bonding time is somewhat critical, especially for the first or uppermost emulsion layer of the multilayer film, I also provide means whereby this time may be readily varied without disturbing or varying in any way the passage of the films through the wetting tank and between the positively driven and first and second tendency driven coacting sprockets and rollers. This means is especially adapted to preclude the possibility of either of the layers being prematurely stripped.

Other features of the present apparatus which contribute to the improved results obtainable with this machine are the sprockets and coacting rollers, which serve to drive and register the films, and the means by which the sprocket and roller may be engaged to automatically preclude damage to the precisely formed sprocket teeth. Another feature of the present invention is the inclusion of means whereby the pressure rollers of the roll down are held in pressure contact with each other while the machine is in operation and automatically held apart when the machine is stopped. This precludes the softer, resilient roller assuming a permanent set while the apparatus is inoperative, which, if allowed to occur, would produce pressure marks on the emulsion layer. Still another feature of the invention resides in the use of a smaller, light-pressure, supplementary roll down unit, located immediately above the positively driven sprocket and roller, which remedies any small disturbance of the initial roll down of the superposed films in the vicinity of the perforations, which may have been caused by the teeth of the registering sprocket.

It is, therefore, an object of this invention to provide an improved apparatus for transferring the strippable emulsion layers of multilayer motion picture film to separate bases or supports.

It is a further object of this invention to provide an improved apparatus of the character described in which the multi-layer film and unsensitized base are rolled down by passing them between pressure rollers prior to their being registered by passage over a registering sprocket.

It is a still further object of this invention to provide an apparatus of the character described in which an improved film drive is used which maintains the rolled down films under tension during the critical part of the bonding period by means of which the superposed films are held in exact registry.

It is a still further object of this invention to provide an apparatus of the character described in which means are provided for effectively varying the bonding time without disturbing the passage of the films through the wetting tank and between the positively driven and first and second tendency driven sprockets and coacting rollers.

It is a still further object of this invention to provide an apparatus of the character described in which coacting sprockets and socket rollers are employed to drive the films, means being included which automatically precludes non-registration of the sprocket teeth and roller openings when the two are brought into engagement.

It is a still further object of this invention to furnish an apparatus of the character described in which is provided means whereby the pressure rollers of the roll down are held in pressure contact with each other while the machine is in operation and automatically held apart when the machine is not running.

It is a still further object of this invention to furnish an apparatus of the character described in which a supplementary roll down unit is employed to correct any small disturbance of the superposed films in the vicinity of the perforations that may have been caused by the teeth of the registering sprocket.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

The present device is particularly intended to be used with a humidifying and conditioning unit such as is disclosed in my Patent 2,417,060. It is in this chamber that the multilayer film and the transfer film are subjected to identical conditions of humidity and temperature, whereby the two films will tend to have substantially the same dimensions to permit their being readily registered. Any discrepancy in size, still remaining after the conditioning, is compensated for by applying tension to the two films during the critical part of the bonding period, as will be obvious from the ensuing description of the present invention. The conditioning chamber, however, forms no part of the present invention. Similarly, a drying cabinet may be employed after the top emulsion has been transferred from the multilayer film to the separate support or base, as described in my Patent 2,417,060, but this, too, forms no part of the present invention which is limited to the apparatus which wets and cleans the two films and brings them into intimate pressure contact and exact registration, preserving the registry until the top emulsion is bonded to the transfer film and the two are stripped from the remainder of the multilayer film. The device is intended for use with such stripping film as is disclosed in U. S. Letters Patent No. 2,367,665, granted January 23, 1945 to Gale F. Nadeau, Alfred B. Starck and the present applicant.

Figure 2:
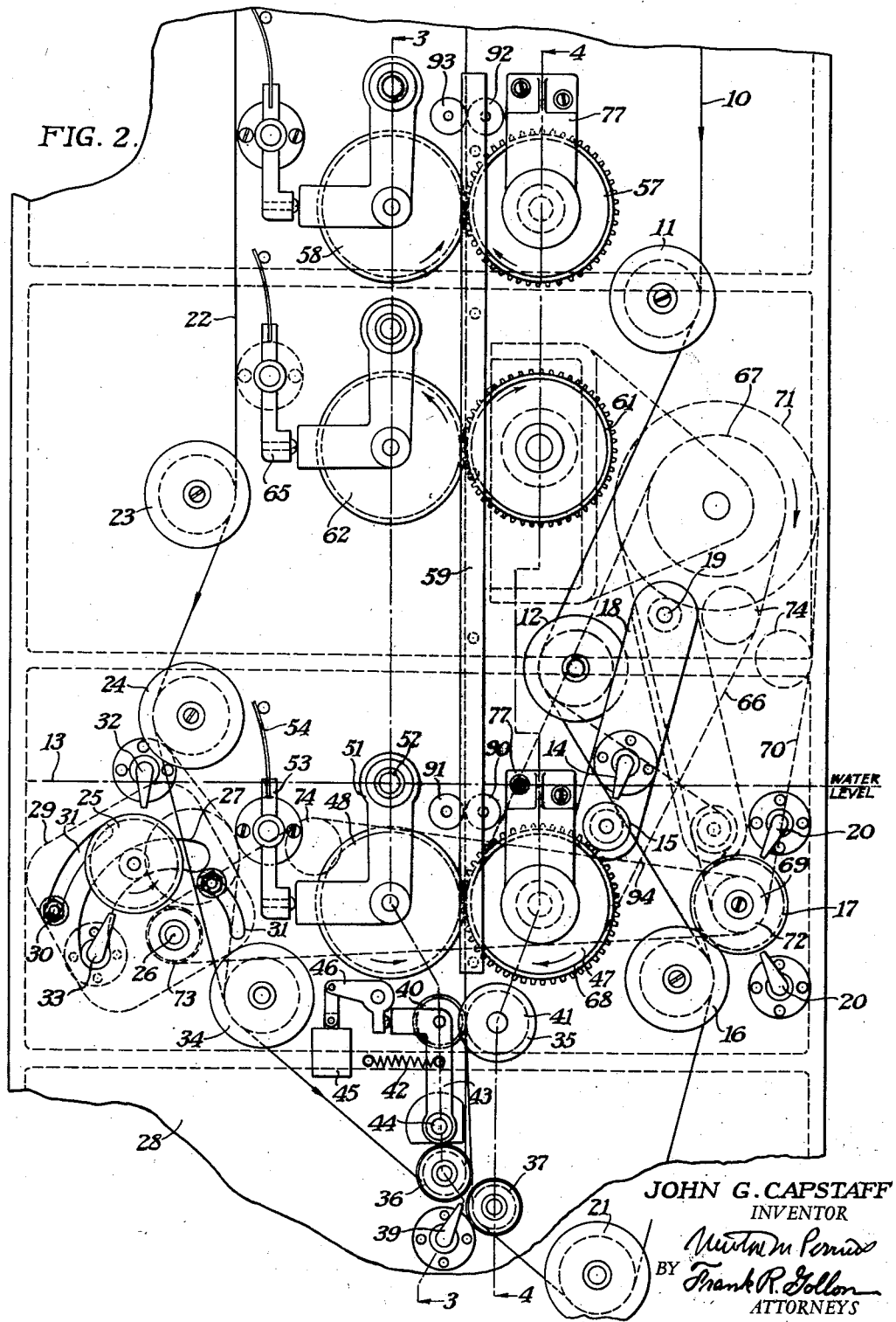
Fig. 2 is an elevational view of the portion of the apparatus in which the films are conveyed to the roll down station, rolled down and initially registered and placed under tension.
Figure 3:
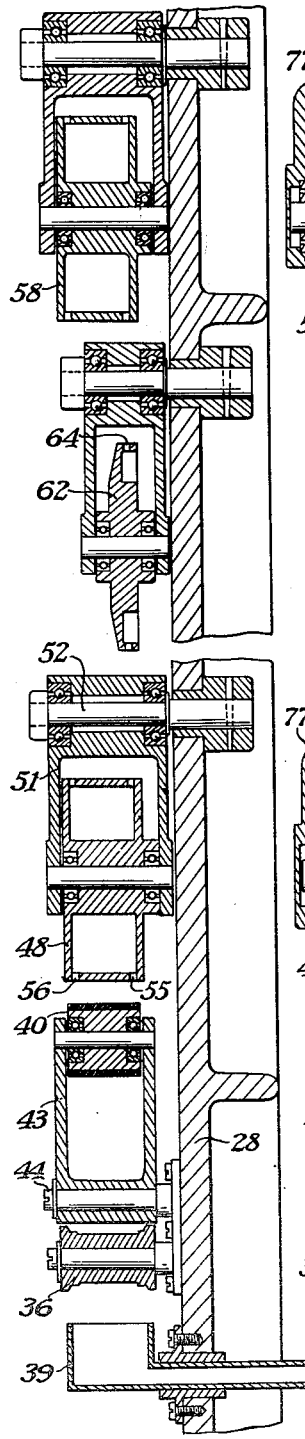
Fig. 3 is a sectional view of the apparatus taken on the line 3—3 of Fig. 2.

The multilayer or stripping film 10 after leaving the humidifying and conditioning unit passes over a series of guide rollers 11 and 12 and below the water level 13 in the wetting tank 80. To remove such air bubbles as may cling to the emulsion surface of the film, water is directed from the jet 14 upon the film as it passes over roller 15. The film then runs between guide roller 16 and the wiper roll 17. The latter is preferably mohair covered, although other materials such as chamois may be employed. The purpose of the wiper roll 17 is to clean the emulsion side of the stripping film 10. This is an especially essential operation when the transfer of the second emulsion is about to be effected. Portions of the stripping layer, which is water permeable and which lies between each pair of emulsion layers, generally remain upon the emulsion side of the multilayer film after the first emulsion has been transferred therefrom. This interlayer obviously should be removed before the multilayer film is rolled down for the second time upon a transfer film in order that a uniformly good bond may be obtained. The degree which the wiper roll 17 contacts the film may be adjusted by changing the position of the roller 15 and associated jet 14 which are mounted upon the arm 18 for pivotal movement about the point 19. In the extreme position of the arm 18, as shown in Fig. 2 in solid lines, the film makes no contact whatsoever with the wiper roll. In making the first transfer there will be no stripping interlayer adherent to the surface of the top emulsion layer and the wiping action will hardly be necessary. A light wiping may be employed, however, to remove other extraneous particles. The other extreme position of the arm 18 is shown in Fig. 2 in broken lines and provides the largest amount of "wrap" about the wiper roll 17 and, therefore, the most complete cleaning or wiping possible with this particular apparatus. Several jets 20 direct water upon the wiper roll 17 to make the cleaning more effective by keeping the mohair surface of the roller 17 free of particles which it has wiped off the film. After passing over guide roller 16 the multilayer film is directed around the roller 21. The latter roller is weighted and has no connection with the mounting plate 28 for reasons which will be discussed below.

After the transfer film or support 22 has passed through the humidifying and conditioning unit, as above noted, it passes downwardly over guide rollers 23 and 24 to a wiping station just below the water level which is intended to clean the surface of the transfer film which is to be bonded to the emulsion of the multilayer film. The wiping station comprises a chamois-covered roller 25, the spindle for which may be pivoted about the point 26, whereby the wiper 25 may be rendered ineffective by removing it from contact with the film 22, as shown in Fig. 2 in solid lines; or the chamois-covered roller may be made to contact the film in varying degrees, in the extreme of which the roller 25 is positioned as shown in broken lines in Fig. 2. The spindle of the wiper roll 25 passes through a slot 27 in the mounting plate 28 and is journalled in the bracket plate 29. This plate 29 is pivotally connected to the mounting plate 28 at 26 and carries several studs 30 which also project through slots 31 in the mounting plate. The bracket plate 29 may be fixedly secured to the mounting plate 28 by tightening the nuts on the threaded ends of the studs 30 to fix the position of the wiper roll 25 relative to the film. A jet 32 fixed to the mounting plate 28 and a second jet 33 fixed to the bracket plate 29, and, therefore, movable therewith, directs water upon the chamois-covered roller to assist the cleaning action of the roller upon the film. It may be here noted that the various guide rollers 11, 12, 16, 23 and 24, the mohair-covered wiper 17 and the arm 18, described above, are all mounted on the plate 28. After passing the wiping station, the film 22 passes over guide roller 34 to a point at which it is about to be rolled down upon the multilayer film 10.

Films 10 and 22 are led to the roll down unit 35 by passing, respectively, over rollers 37 and 36 which bring the films into near parallelism as they approach the roll down unit. A jet 39 directs a stream of water, preferably filtered, between the converging surfaces which are to be bonded. This jet affords a final removal of extraneous particles and air bubbles from the film surfaces just before the two are brought into pressure contact. Obviously, additional jets, such as those represented by numerals 14 and 39, may be positioned at various places along the travel of the films to further cleanse the films. The roll down 35 includes two pressure rollers 40 and 41 the first of which is preferably rubber covered and the second stainless steel. The latter roller includes flanges the distance between which is only slightly greater than the film width. The flanges prevent side wandering of the films. Both rollers, however, may be rubber covered. They are designed to exert a uniform pressure of approximately six to eight pounds over the whole of the two films which pass between them, thus not only bringing the two films into intimate contact but also pressing out surplus water between the engaging surfaces. In order that the rubber roller may not assume a permanent set when the machine is not in operation, a spring 42 acts upon the arm 43 which mounts the pressure roller 40, causing the arm to pivot about the spindle 44, thereby removing the roller 40 from contact with pressure roller 41. Pressure contact of the rollers is effected automatically when the machine is put into operation, this operation also energizing the solenoid 45 which rotates the rocker arm 46. The rocker arm when so rotated bears upon the arm 43, thus moving the pressure roller 40 into contact with the roller 41 against the biasing action of the spring 42. The pressure between the rollers is preferably varied by varying the tension of the spring 42.

Figure 5:
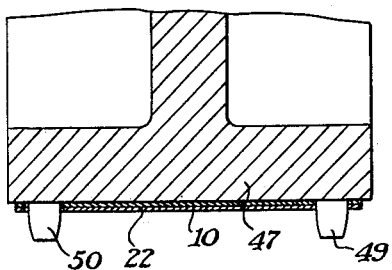
Fig. 5 is an enlarged, sectional view of a portion of a sprocket and the films thereon showing the relative dimensions of the sprocket teeth and the film perforations.
Figure 6:
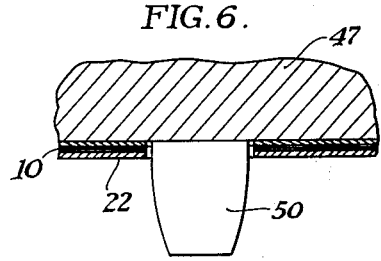
Fig. 6 is a greatly enlarged, sectional view of a sprocket tooth of one of the two rows of teeth and the films engaged thereby showing the difference in the widths of the tooth and the film perforations.
Figure 7:
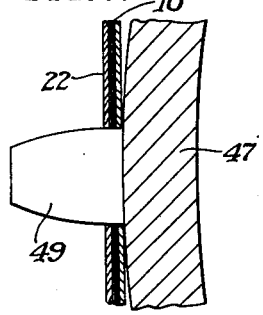
Fig. 7 is a greatly enlarged, sectional view of a sprocket tooth and the films engaged thereby showing the relative thickness of the tooth and the height of the film perforations.

Immediately after being rolled down, the films are precisely registered by their passage between the sprocket 47 and the coacting socket roller 48. The sprocket has two rows of teeth 49 and 50 which are especially designed for use with film having the Eastman-type perforation; i. e. those having parallel straight sides connected by small arcs. The teeth in row 49 are adapted to fill the perforations laterally while the width of those in row 50 is slightly less than the width of the perforations to allow for a slight shrinkage tolerance in film width. This dimensional relationship between sprocket teeth and film perforations is illustrated in Figs. 5 and 6. Both rows of teeth preferably also fill the film perforations longitudinally, as seen in Fig. 7, although this is not strictly necessary. However, an erratic and considerable back-drag upon one or both of the films, which may be produced by the wiper rolls 17 and 25, and/or other elements of the apparatus prior to the roll down unit 35, may cause some disturbance of the registry during the critical portion of the bonding period. This disturbance can be largely eliminated by the use of sprocket teeth which fill the perforations longitudinally and the use of teeth so dimensioned is, therefore, preferred as a precautionary measure.

The sprocket teeth register with two rows of openings 55 and 56 in the socket roller 48. The latter is normally held in coacting relation with the sprocket 47, being mounted upon the arm 51 which pivots about the spindle 52. Pressure is normally exerted upon the arm 51 by the spring-biased, pivoted element 53, the spring-biasing being effected by the leaf spring 54. The films after being rolled down, while in intimate contact, have not yet become bonded and may be easily slid upon each other. Because of this, they are readily precisely registered as they pass between the sprocket 47 and the roller 48. Since the initial bond established at the roll down unit 35 may be disturbed somewhat in the vicinity of the film perforations by the stripping of the superposed films from the sprocket 47, I provide a smaller supplementary roll down unit immediately above the sprocket 47 and socket roller 48. This unit, consisting preferably of the rubber coated rollers 90 and 91, is positioned below the water surface in tank 80 and is somewhat smaller than the roll down unit 35, exerting a pressure upon the films of less than one-half pound. This supplementary roll down reestablishes the initial bond, if disturbed by the withdrawal of the sprocket teeth from the film perforations, without affecting the registration. It is extremely important that the supplementary roll down exert only a very light pressure upon the films to preclude the possibility of the precise registration effected by sprocket 47 being disturbed. While the supplementary roll down is described as comprising a pair of rollers, it is understood that it may instead take the form of a single roller and a pressure plate between which the superposed films are rolled down. Instead of a pressure plate the track 59, described below, may be used.

A second sprocket 57 and socket roller 58, positioned a short distance beyond the first sprocket station, maintain the initial registry of the superposed films 10 and 22. The construction of this sprocket and roller is essentially identical to that of sprocket 47 and socket roller 48, the second sprocket 57, however, being biased in its operation or rotation to maintain the superposed film strips under tension in the interval of travel of the films between sprockets 47 and 57. I prefer to provide such bias by positively driving the lower sprocket 47 and by driving the upper sprocket 57 by a friction or tendency drive tending to operate at a higher rate of speed than does sprocket 47. By such means the superposed films are maintained under tension between the two sprockets and the registration established at each of the two sprocket stations is preserved while the films travel from the lower to the upper. It is during this interval of travel that the transfer film 22 becomes initially bonded to the top emulsion layer of the multi-layer film 10 and it is during this critical period that it is of the utmost importance that the registration between the two films remains undisturbed. The maintenance of the films under tension preserves this registry by compensating for slight differences in film length, which may still exist despite the treatment in the humidifying and conditioning chamber, by the relatively greater stretching of the shorter film between the two sprocket stations. A second supplementary roll down unit, preferably consisting of the rubber coated rollers 92 and 93 and similar to the first supplementary roll down unit, may be positioned immediately above the sprocket 57 and socket roller 58. Its purpose is similar to that of the first, that is, to correct any slight disturbance of the bond that may have been caused by withdrawal of the teeth of sprocket 57. However, since the bond between the films has become quite strong by this time, there is not too much likelihood of its having been affected by the stripping of the films from sprocket 57. I, therefore, find that this supplementary roll down may be omitted, although it may be included as a precautionary measure.

Figure 8:
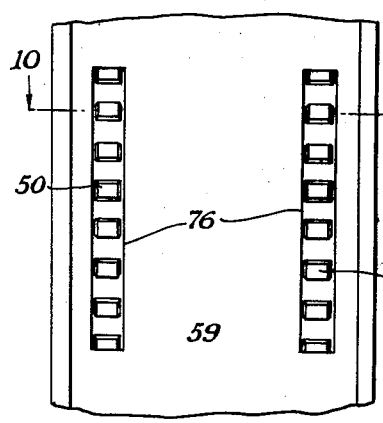
Fig. 8 is an enlarged view of a portion of the film track showing the sprocket teeth protruding through slots therein.
Figure 9:
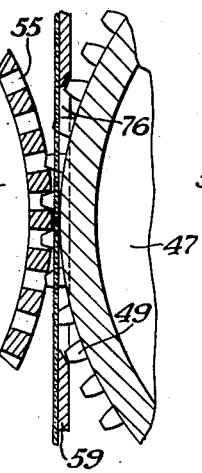
Fig. 9 is an enlarged sectional view through the film track and the coacting sprocket and socket roller.
Figure 10:
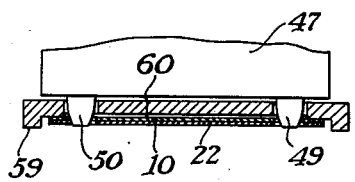
Fig. 10 is a sectional view taken on the line 10—10 of Fig. 8 showing the sprocket, the film track and the film carried on the track.

A track 59, extending between the two sprockets and their coacting socket rollers, as shown in Fig. 2, serves a dual purpose. It provides first a means for correctly alining the several sprockets and their respective coacting rollers. Secondly, it functions as means for stripping the superposed films from each sprocket as they pass between each sprocket and its associated socket roller. This track is recessed as at 60 (see Fig. 10) to reduce the possibility of the picture area of the film being scratched by rubbing upon the track surface. Where the track 59 is positioned between each sprocket and its coacting roller, two slots 76 are cut therein to receive the sprocket teeth, as illustrated in Figs. 8 and 9. The track is similarly cut away between each pair of supplementary pressure rollers.

It has also been found desirable, though not essential, to provide means intermediate the two sprocket stations to preclude relative lateral movement between the superposed films. In the illustrated form of my device this means comprises an idler sprocket 61 and socket roller 62, the former having a single row of teeth 63 and the latter a row of openings 64 registering therewith. The row of teeth 63 are aligned with the teeth in sprockets 47 and 57 which are adapted to laterally fill the film perforations. The teeth 63 are themselves adapted to fill the perforations laterally but not longitudinally, having a thickness less than the height of the film perforations, their only purpose being to prevent relative lateral movement between the films as they travel between the two sprocket stations. The socket roller 62 and sprocket 61 are maintained in engagement by the spring-biased arm 65 which is similar in structure and in operation to the means employed for a like purpose at the two sprocket stations. The several spring-biased arms, such as 53 and 65, the sprocket supporting brackets 77, the socket roller supporting arms, such as 51, and the various elements of the roll down unit 35 and the supplementary roll downs are conveniently supported on the mounting plate 28.

Figure 4:
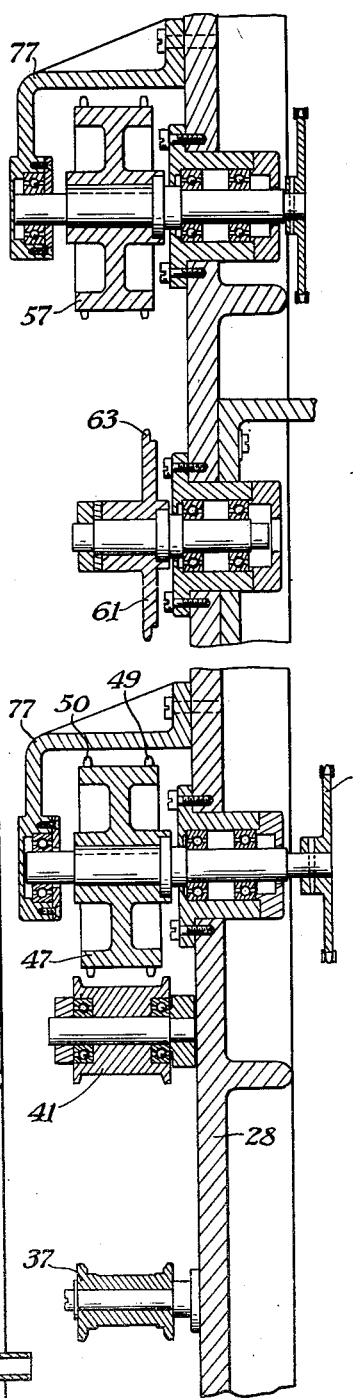
Fig. 4 is a similar sectional view of the apparatus taken on the line 4—4 of Fig. 2.

As noted above, the sprocket 47 is positively driven. This is preferably accomplished by a chain drive 66 extending between a driving sprocket 67 and a sprocket 68 concentrically mounted in fixed relation to the film sprocket 47 (see Figs. 2 and 4). The mohair-covered roller 17 is driven by the chain 70 connecting a driving sprocket 71, concentrically mounted with 67, and a sprocket 69 fixed concentrically to the wiper roll 17. A third chain drive 94 extends between a second sprocket 72 mounted concentrically with the wiper roll 17 and a sprocket 73 which rotates about the axis 26. Rotation of the sprocket 73 is transmitted to the chamois-covered roller 25 by a pair of spur gears (not shown). All three chain drives 66, 70 and 94 may include slack take-up means 74 for tightening the respective chains. As noted above, the sprocket 57 and coacting roller 58 are driven by a friction or tendency drive tending to operate at a higher rate of speed than the sprocket 47 and roller 48. The tendency drive employed for this purpose must not be erratic but, on the contrary, smooth and constant. Such mechanisms are known, however, and the particular means which I employ form no part of this invention. However, for the sake of illustration reference is made to United States Letters Patent No. 2,025,371, granted to George C. Beidler on December 24, 1935, in Fig. 4 of which is illustrated a conventional friction drive wherein a sprocket is frictionally driven by its being spring pressed against a clutch plate which is fixed to a driven shaft. Connecting the sprocket of such a friction drive as is illustrated in Fig. 4 of Beidler to the sprocket which is fixed to the shaft upon which my film sprocket 57 is mounted (see Fig. 4) by means of a sprocket chain would provide the requisite type of drive for the purpose of my invention and it would require no more than the correct relative proportioning of the several drive sprockets and selection of driven shaft speed to furnish the necessary amount of overdrive. However, the selection and design of a friction or tendency drive which is suitable for the purpose of this invention is well within the ability of those skilled in the art and it is repeated that the particular frictional drive means which I employ form no part of this invention. The various units of the driving mechanism such as chains and drive sprockets are positioned to the rear of the mounting plate 28, whereas the various elements of the film transport mechanism, such as the rollers, wiper rolls, film sprockets and coacting socket rollers are positioned to the front.

Figure 11:
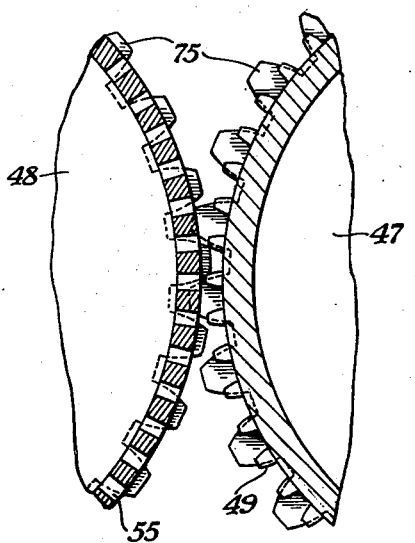
Fig. 11 illustrates in section a modification of the coacting sprocket and socket roller, which prevents non-registration of the sprocket teeth and the roller openings as the two are brought into engagement.
Figure 12:
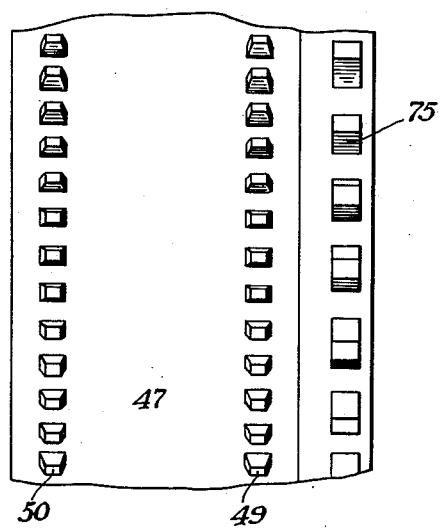
Fig. 12 is an edge view of the modified sprocket of Fig. 11.

Inasmuch as the teeth of the film sprockets are precisely formed, care must be exercised when the socket roller is brought into engagement with the sprocket in order that the sprocket teeth are not damaged by contact with the edge of the roller. To insure automatic registration of the sprocket teeth and openings in the roller as these two are brought together, I may provide each coacting sprocket and each roller with a concentric gear element 75 which is fixed thereto, as seen in Figs. 11 and 12. The gear teeth are so dimensioned and positioned relative to the sprocket teeth and roller openings that as the gear teeth mesh, the sprocket teeth and roller openings automatically register. This is clearly illustrated in Fig. 11. Obviously, the sprocket teeth will at all times be prevented from making contact with the edge of the roller by the teeth of one of the gear elements interfering with or failing to mesh with those of the other element.

Although the gear element is illustrated in Fig. 12 as being attached directly to a sprocket, it is apparent that the same results may be had by affixing such gear elements to shafts to which the sprockets and rollers are similarly affixed at a distance therefrom.

It can be here emphasized that the various sprockets and their coacting socket rollers do not function in any manner or means as roll down units. On the contrary, no pressure is exerted by the socket and roller upon the surfaces of the film, sufficient clearance being provided between the peripheral edges of the socket and roller to preclude this. The clearance can be provided by properly dimensioning the teeth of gear elements 75, or, where these elements are not employed, by the use of stops which limit the movement of the socket roller supporting arms 51 as the rollers are swung into engagement with their respective sprockets.

As pointed out in my Patent 2,417,060, it is important that the wetting time be correct. This will have to be determined experimentally for the particular batch of film that is to be stripped. While the speed at which the film is running may be changed, the wetting time is best varied by changing the length of the path of the film in the water tank. This may be accomplished by drawing down the lowest loop of the film 10 (see Fig. 2) which passes about the roller 21. Since the latter is weighted and free of the mounting plate 28, this roller will automatically position itself to any change in the length of this film loop. Such an adjustment is not nearly so necessary for the transfer film 22 as for the multilayer 10 and has, therefore, been omitted. The incorporation of a similar roller in the path of the transfer film could, however, be readily effected, if desired.

Bonding first occurs while the films advance from the roll down unit 35 and the registering sprocket 47 and its coacting socket roller 48 to the tendency driven sprocket 57 and its coacting roller 58. This is the most critical period in the travel of the superposed films. However, as noted above, the adhesion of the transfer film to the multilayer has not been completed by the time they leave the station occupied by the sprocket 57 and roller 58. It is necessary, therefore, that some precaution continue to be taken to hold the superposed films in exact registration even after they pass beyond the sprocket 57. This is accomplished by the use of a second tendency driven sprocket 81 and coacting roller 82 further on in the travel of the film. These elements, like the sprocket and roller 57 and 58, to which they are similar, are driven by a friction or tendency drive which tends to drive the superposed films at an even higher rate of speed than they are driven by the sprocket and roller 57 and 58, whereby the films are maintained under tension as they travel between sprockets 57 and 81, which insures that the films will remain in registration despite small differences in film length and, therefore, in perforation pitch. An air squeegee 99 is positioned just above the sprocket 57 for removing excess moisture from the surfaces of the superposed films. Such a squeegee is described in United States Letters Patent No. 2,289,753, granted to me July 14, 1942. By the time the films have passed sprocket 81 the bonding has progressed to a point at which there is no longer any danger of relative slippage occurring between the transfer film and the top emulsion layer.

Figure 1:
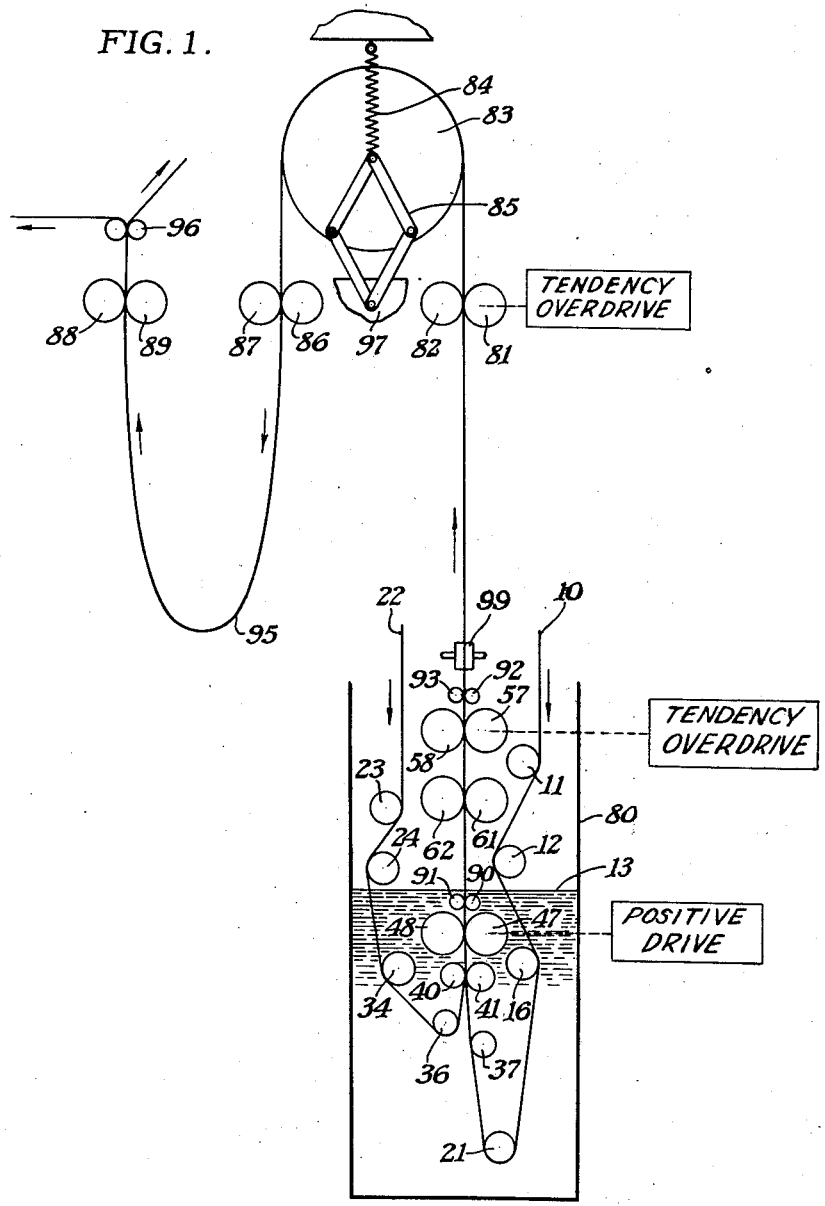
Fig. 1 is a diagrammatic view of an apparatus embodying the invention showing the paths of the multilayer film and the transfer film through the apparatus.

Just as it is important that the wetting time be correctly determined, so it is necessary that the bonding time be correctly ascertained. While the bonding time may be varied by changing the speed of the film, I prefer to provide means by which a free loop of film 95 of adjustable length may be interposed between the sprocket station 81 and the stripper 96. Since the adhesion between the transfer film and the emulsion layer of the multilayer film continues to develop after the superposed films have passed beyond the sprocket station 81 and up to the time the films are stripped, a change in the length of path between these two points will effect a corresponding change in the bonding time. I, therefore, provide a large, flanged, idler wheel 83 which turns the direction of the moving film downward as noted in Fig. 1. A sprocket 87 and coacting socket roller 86, similar in construction to the sprocket 81 and roller 82, are provided just beyond the idler wheel 83. Sprockets 87 and 81 are positively interconnected, as by a chain drive, whereby the films are caused to pass the sprocket stations 81 and 87 at the same rate of speed. The spindle of the wheel 83 is supported by a toggle 85 secured at one end to a rigid support 97, the other end being biased upwardly by the spring 84. The weight of the wheel and tension of the spring are so balanced as to provide a slight upward pressure on the wheel which is just sufficient to take up small variations in film length which may be caused by small differences in film perforation pitch in the leader strips, the latter strips being necessary for threading the films through the apparatus.

A sprocket 89 and socket roller 88, which are similar in size and construction to sprocket 87 and roller 86, are positioned adjacent to the stripper 96. Sprockets 89 and 87 are positively interconnected, as are sprockets 87 and 81, which permits the films to travel past the sprocket stations 89 and 87 at identical rates of speed. Between the sprockets 89 and 87 the superposed films are permitted to hang in a free loop 95, the length of which may be adjusted to increase or decrease the bonding time as may be desired. The bonding time for the top or blue emulsion is somewhat critical, since too long a period might result in an excess of moisture penetrating not only this emulsion layer and the underlying interlayer, but also the green emulsion layer and interlayer between the green and red emulsions, resulting in a reduction of the adhesion of the latter interlayer to the gelatin of the green and red emulsions which might cause both the green and blue emulsions to be stripped from the mulitlayer film at the stripping station 96. The bonding of the green emulsion to the transfer film is, of course, less critical since there is no danger of stripping two emulsions as above, inasmuch as the red emulsion is relatively permanently fixed to the multilayer film base. After being stripped at 96, the two film bands proceed to a drying cabinet such as is described in my Patent 2,417,060, after which the whole of the above operation is repeated as the second or green emulsion layer is transferred from the multilayer film to a second transfer film.

I have found that, with a film speed of 30 feet per minute, a generally satisfactory distance between the sprockets 47 and 57 is approximately 18 inches and the distance between sprockets 57 and 81 approximately 4 feet. The various dimensions and distances between elements may be determined experimentally, however, for a particular film speed.

From the foregoing description, it will be apparent that I have provided means for obtaining all of the objects and advantages of this invention.

What I claim and desire to secure by Letters Patent of the United States is:

1. In an apparatus for transferring an emulsion layer from a perforated film strip to another similarly perforated strip, pressure means for bringing the film strips into intimate contact prior to their registration, a positively-driven sprocket for registering the superposed film strips, and a second driven sprocket spaced from the first and biased to maintain the superposed film strips under tension in the interval of travel of the films between said spaced sprockets.

2. In an apparatus for transferring an emulsion layer from a perforated film strip to another similarly perforated strip, means for pressing the film strips into intimate contact prior to their being registered, a positively-driven sprocket for accurately registering the superposed film strips, and a second sprocket driven by a friction drive which tends to rotate the sprocket at a higher rate of speed than said first sprocket, whereby the superposed film strips are maintained under tension during the interval of travel between said sprockets.

3. In an apparatus for transferring an emulsion layer from a perforated film strip to another similarly perforated strip, pressure rollers for rolling down the two separated film strips into intimate contact, a positively-driven sprocket for accurately registering the superposed film strips, a second sprocket driven by a friction drive which tends to rotate the sprocket at a higher rate of speed than said first sprocket, whereby the superposed film strips are maintained under tension during the interval of travel between said sprockets, and supplementary pressure means positioned adjacent said first sprocket to correct any disturbance in the roll down of the superposed films caused by the first sprocket.

4. In an apparatus for transferring an emulsion layer from a perforated film strip to another similarly perforated strip, a positively-driven sprocket for registering the film strips, a second sprocket driven by a friction drive which tends to rotate the sprocket at a higher rate of speed than said first sprocket, whereby the film strips are maintained under tension during the interval of travel between the sprockets, said sprockets each having a row of teeth adapted to fill the film perforations both laterally and longitudinally, pressure rollers for rolling down the film strips into intimate contact prior to their registration by the first of said sprockets, and a relatively light-pressure, supplementary roll down unit positioned adjacent to said first sprocket for correcting any disturbance of the initial roll down of the films caused by the first sprocket.

5. In an apparatus for transferring an emulsion layer from a perforated film strip to another similarly perforated strip, a positively-driven sprocket for registering the film strips, a second sprocket driven by a friction drive which tends to rotate the sprocket at a higher rate of speed than said first sprocket, said sprockets each having a row of teeth adapted to fill the film perforations both laterally and longitudinally, pressure rollers for bringing the film strips into intimate contact prior to their registration by the first of said sprockets, biasing means for keeping said rollers separated, and solenoid-actuated means automatically functioning in opposition to said biasing means when the apparatus is in operation for maintaining the rollers in pressure contact with the films.

6. In an apparatus for transferring an emulsion layer from a perforated film strip to another similarly perforated strip, a positively-driven sprocket for accurately registering the film strips, a second sprocket driven by a friction drive which tends to rotate the sprocket at a higher rate of speed than said first sprocket, whereby the film strips are maintained under tension during the interval of travel between the sprockets, said sprockets having two rows of teeth, the teeth of one row being adapted to fill the film perforations laterally, the lateral dimension of the teeth of the other row being slightly smaller than the width of the film perforations, and pressure rollers positioned to bring the film strips into intimate contact just prior to their engagement by the first of said sprockets.

7. In an apparatus for transferring an emulsion layer from a perforated film strip to another similarly perforated strip, a positively-driven sprocket for accurately registering the film strips, a second sprocket driven by a friction drive which tends to rotate the sprocket at a higher rate of speed than said first sprocket, whereby the film strips are maintained under tension during the interval of travel between the sprockets, said sprockets having two rows of teeth, the teeth of one row being adapted to fill the film perforations laterally, the lateral dimension of the teeth of the other row being slightly smaller than the width of the film perforations, means positioned between the sprockets to preclude relative lateral movement of the films, pressure rollers positioned to roll down the film strips into intimate contact just prior to their engagement by the first of said sprockets, and a relatively light-pressure supplementary roll down unit positioned adjacent to said first sprocket for correcting any disturbance of the initial roll down of the films caused by the first sprocket.

8. In an apparatus for transferring an emulsion layer from a perforated film strip to another similarly perforated strip, a positively-driven sprocket for registering the film strips, a second sprocket driven by a friction drive which tends to rotate the sprocket at a higher rate of speed than said first sprocket, and a third sprocket driven by a friction drive which tends to rotate the sprocket at a higher rate of speed than said second sprocket, whereby the film strips are maintained under tension during the interval of travel between the sprockets, and pressure means for bringing the film strips into intimate contact prior to their registration by the first of said sprockets.

9. In an apparatus for transferring an emulsion layer from a perforated film strip to another similarly perforated strip, a driven coacting sprocket and roller for registering the film strips, a second driven coacting sprocket and roller spaced from the first and biased in its rotation to maintain the film strips under tension between the spaced sprockets, each sprocket having two rows of teeth and each roller having two rows of openings therein registering with said teeth, and pressure rollers for bringing the film strips into intimate contact prior to their registration by the first of said coacting sprockets and rollers.

10. In an apparatus for transferring an emulsion layer from a perforated film strip to another similarly perforated strip, a positively-driven coacting sprocket and roller for registering the film strips, a second coacting sprocket and roller driven by a friction drive which tends to rotate the coacting sprocket and roller at a higher rate of speed than said first coacting sprocket and roller, and a third coacting sprocket and roller driven by a friction drive which tends to rotate the coacting sprocket and roller at a higher rate of speed than said second coacting sprocket and roller, whereby the film strips are maintained under tension during the interval of travel between the sprockets, each sprocket having two rows of teeth and each roller having two rows of openings therein registering with said teeth, and pressure rollers for bringing the film strips into intimate contact prior to their registration by the first of said coacting sprockets and rollers.

11. A device according to claim 10 in which the teeth in one of said rows are adapted to fill the film perforations laterally, the lateral dimension of the teeth of the other row being slightly smaller than the width of the film perforations.

12. In an apparatus for transferring an emulsion layer from a perforated film strip to another similarly perforated strip, a positively-driven coacting sprocket and roller for registering the film strips, a second coacting sprocket and roller driven by a friction drive which tends to rotate the coacting sprocket and roller at a higher rate of speed than said first coacting sprocket and roller, whereby the film strips are maintained under tension during the interval of travel between the sprockets, a track extending between said sprockets, each sprocket having a row of teeth and each roller having a row of openings therein registering with said teeth, the teeth being adapted to fill the film perforations both laterally and longitudinally, pressure rollers for bringing the film strips into intimate contact prior to their registration by the first of said coacting sprockets and rollers, and a series of fluid-directing jets and wiper rolls for cleaning the surfaces of the two film strips prior to their being brought into intimate contact with each other by the action thereon of said pressure rollers.

13. In an apparatus for transferring an emulsion layer from a perforated film strip to another similarly perforated strip, a positively-driven coacting sprocket and roller for registering the film strips, a second coacting sprocket and roller driven by a friction drive which tends to rotate the coacting elements at a higher rate of speed than said first coacting sprocket and roller, whereby the film strips are maintained under tension during the interval of travel between the sprockets, a coacting idler sprocket and roller positioned between said other sprockets to preclude relative lateral movement of the films, each sprocket having a row of teeth and each roller having a row of openings therein registering with said teeth, and pressure rollers for bringing the film strips into intimate contact just prior to their engagement by the first of said coacting sprockets and rollers.

14. In an apparatus for transferring an emulsion layer from a perforated film strip to another similarly perforated strip, a coacting sprocket and roller for registering the film strips, a second coacting sprocket and roller adapted to maintain the film strips under tension between the two sprockets, each sprocket having two rows of teeth and each roller having two rows of openings therein registering with said teeth, the teeth of one row being adapted to fill the film perforations laterally and the teeth of the other row having a lateral dimension slightly smaller than the width of the film perforations, pressure rollers for rolling down the film strips into intimate contact prior to their registration by the first of said coacting sprockets and rollers, and a relatively light-pressure, supplementary roll down unit positioned adjacent to said first coacting sprocket and roller for correcting any disturbance of the initial roll down of the films caused by the first sprocket.

15. In an apparatus for transferring an emulsion layer from a perforated film strip to another similarly perforated strip, a readily separable sprocket and roller normally held in coacting relation with each other for registering the film strips, a second readily separable sprocket and roller normally held in coacting relation with each other adapted to maintain the film strips under tension between the two sprockets, each sprocket having two rows of teeth and each roller having two rows of openings therein adapted to register with said teeth, pressure rollers for bringing the film strips into intimate contact prior to their registration by the first of said normally coacting sprockets and rollers, and a series of fluid-directing jets for cleaning the surfaces of the two film strips prior to their being brought into intimate contact with each other by the action thereon of said pressure rollers.

16. In an apparatus for transferring an emulsion layer from a perforated film strip to another similarly perforated strip, a coacting sprocket and roller adapted to be positively driven for accurately registering the film strips, a second coacting sprocket and roller adapted to be driven by a friction drive which tends to rotate the second coacting elements at a higher rate of speed than said first coacting sprocket and roller, whereby the film strips are maintained under tension during the interval of travel between the sprockets, each sprocket having two rows of teeth and each roller having two rows of openings therein registering with said teeth, the teeth of one row being adapted to fill the film perforations both laterally and longitudinally and the teeth of the other row adapted to fill the perforations longitudinally and having a lateral dimension slightly smaller than the width of the film perforations, and pressure rollers positioned to bring the film strips into intimate contact just prior to their engagement by the first of said coacting sprockets and rollers.

17. A device according to claim 16 which includes biasing means for keeping said pressure rollers separated, and solenoid-actuated means automatically functioning in opposition to said biasing means, when the apparatus is in operation, for maintaining the rollers in pressure contact with the films.

18. A device according to claim 17 which includes a series of fluid-directing jets for cleaning the surfaces of the two film strips prior to their being brought into intimate contact with each other by the action thereon of said pressure rollers.

19. In an apparatus for transferring an emulsion layer from a perforated film strip to another similarly perforated strip, a readily separable sprocket and roller normally held in coacting relation with each other adapted to be positively driven for accurately registering the film strips, a second readily separable sprocket and roller normally held in coacting relation with each other adapted to be driven by a friction drive which tends to rotate the second pair of elements at a higher rate of speed than said first coacting sprocket and roller, whereby the films are maintained under tension during the interval of travel between the sprockets, each sprocket having two rows of teeth and each roller having two rows of openings therein adapted to register with said teeth, the teeth of one row being adapted to fill the film perforations laterally and the teeth of the other row having a lateral dimension slightly smaller than the width of the film perforations, pressure rollers positioned to roll down the film strips into intimate contact just prior to their engagement by the first of said normally coacting sprockets and rollers, biasing means for keeping said pressure rollers separated, solenoid-actuated means automatically functioning in opposition to said biasing means, when the apparatus is in operation, for maintaining the rollers in pressure contact with the films, and a supplementary roll-down unit positioned immediately adjacent to one of said sprockets for correcting any disturbance of the initial roll down of the films caused by said sprocket.

20. In a perforated film transport device, a rotatable sprocket having a row of teeth thereon adapted to engage the film perforations, a roller having a row of openings adapted to register with said sprocket teeth, means for engaging and disengaging said sprocket and roller, means for maintaining said roller and sprocket in coacting engagement with each other to transport the perforated film between the peripheral surfaces thereof, a gear element fixed to and concentric with the sprocket, a second gear element fixed to and concentric with the roller, said gear elements being so related to the sprocket teeth and roller openings that the meshing of said gear elements automatically registers the teeth and openings of the sprocket and roller, respectively, as these elements are brought into engagement.

21. In an apparatus for transferring an emulsion layer from a perforated film strip to another similarly perforated strip, a readily separable sprocket and roller normally held in coacting relation with each other for registering the film strips, a second readily separable sprocket and roller normally held in coacting relation with each other adapted to maintain the film strips under tension between the two sprockets, each sprocket having a row of teeth and each roller having a row of openings therein adapted to register with said teeth, each sprocket and roller having a concentric gear fixed thereto, the gears being so related to the sprocket teeth and roller openings that the sprocket teeth and roller openings automatically register upon the meshing of the gears, and pressure means for bringing the film strips into intimate contact prior to their registration by the first of said normally coacting sprockets and rollers.

22. In an apparatus for transferring an emulsion layer from a perforated film strip to another similarly perforated strip, a readily separable sprocket and roller normally held in coacting relation with each other adapted to be positively driven for registering the film strips, a second readily separable sprocket and roller normally held in coacting relation with each other adapted to be driven by a friction drive which tends to rotate the second sprocket and roller at a higher rate of speed than said first coacting sprocket and roller, whereby the films are maintained under tension during the interval of travel between the sprockets, each sprocket having two rows of teeth and each roller having two rows of openings therein adapted to register with said teeth, each sprocket and roller having a concentric gear fixed thereto, the gears being so related to the sprocket teeth and roller openings that the sprocket teeth and roller openings automatically register upon the meshing of the gears, the teeth of one row of sprocket teeth being adapted to fill the film perforations laterally and the teeth of the other row having a lateral dimension slightly smaller than the width of the film perforations, and pressure rollers positioned to bring the film strips into intimate contact just prior to their engagement by the first of said normally coacting sprockets and rollers.

23. A device according to claim 22 which includes biasing means for keeping said pressure rollers separated, solenoid-actuated means automatically functioning in opposition to said biasing means, when the apparatus is in operation, for maintaining the rollers in pressure contact with the films, and a series of fluid-directing jets and wiper rolls for cleaning the surfaces of the two film strips prior to their being brought into intimate contact with each other by the action thereon of said pressure rollers.

24. In an apparatus for transferring an emulsion layer from a perforated film strip to another similarly perforated strip, a sprocket adapted to be positively driven for registering the film strips, a second sprocket adapted to be driven by a friction drive which tends to rotate the sprocket at a higher rate of speed than said first sprocket, and a third sprocket adapted to be driven by a friction drive which tends to rotate the sprocket at a higher rate of speed than said second sprocket, whereby the films are maintained under tension during the interval of travel from said first to said third sprocket, pressure means for bringing the films strips into intimate contact prior to their registration by the first sprocket, a fourth and fifth sprocket positively interconnected with said third sprocket and adapted to drive the films at a uniform rate of speed past each of the third, fourth and fifth sprockets, a wheel, movable at right angles to its axis and biased in one direction, positioned between the third and fourth sprockets adapted to take up film slack, the fourth and fifth sprockets being relatively positioned to permit a free loop of film to be suspended therebetween, and a stripper beyond the fifth sprocket.

25. In an apparatus for transferring an emulsion layer from a perforated film strip to another similarly perforated strip, a tank for containing a wetting fluid, a series of rollers for guiding the film strips downwardly into the tank, a roll down unit mounted below the intended fluid level in said tank for bringing the separate firm strips into intimate contact, a coacting sprocket and roller positioned immediately above the roll down unit and below the said fluid level, adapted to be positively driven for registering the rolled down films, and a second coacting sprocket and roller positioned above the first sprocket and roller and above said fluid level, adapted to be driven by a friction drive which tends to rotate the second sprocket and roller at a higher rate of speed than said first sprocket and roller, whereby the films are maintained under tension during the interval of travel between the sprockets.

26. In an apparatus for transferring an emulsion layer from a perforated film strip to another similarly perforated strip, a tank for containing a wetting fluid, a series of rollers for guiding the film strips downwardly into the tank, a roll down unit mounted below the intended fluid level in said tank for bringing the separate firm strips into intimate contact, a coacting sprocket and roller positioned immediately above the roll down unit and below said fluid level, adapted to be positively driven for registering the rolled down films, a supplementary roll down unit positioned immediately above said coacting sprocket and roller and below said fluid level, adapted to correct any disturbance of the initial roll down of the films caused by the sprocket, a second coacting sprocket and roller positioned above the supplementary roll down unit and above said fluid level, adapted to be driven by a friction drive which tends to rotate the sprocket and roller at a higher rate of speed than said first sprocket and roller to maintain the films under tension during the interval of travel between the sprockets, and means comprising a free roller for varying the length of a film strip within said tank.

27. In an apparatus for transferring an emulsion layer from a perforated film strip to another similarly perforated strip, a tank for containing a wetting fluid, a series of rollers for guiding the film strips downwardly into the tank, pressure rollers mounted below the intended fluid level in said tank for rolling down the film strips into intimate contact, a coacting sprocket and roller positioned immediately above the pressure rollers and below said fluid level, adapted to be positively driven for registering the rolled down films, a second coacting sprocket and roller positioned above the first sprocket and roller and above said fluid level, adapted to be driven by a friction drive which tends to rotate the second sprocket and roller at a higher rate of speed than said first sprocket and roller, a third coacting sprocket and roller positioned above said second sprocket and roller, adapted to be driven by a friction drive which tends to rotate the third sprocket and roller at a higher rate of speed than said second sprocket and roller, a fourth and fifth coacting sprocket and roller positively interconnected with the third sprocket and roller and adapted to drive the films at a uniform rate of speed past each of the third, fourth and fifth sprockets, means positioned between the third and fourth coacting sprockets and rollers adapted to take up film slack, the fourth and fifth coacting sprockets and rollers being relatively positioned to permit a free loop of film to be suspended therebetween, and a stripper beyond said fifth sprocket and roller.

28. In an apparatus for transferring an emulsion layer from a perforated film strip to another similarly perforated strip, pressure means for bringing the film strips into intimate contact prior to their registration, a pair of spaced sprockets for registering the films at two spaced stations after the films are brought into intimate contact, and drive means for said sprockets, said drive means being also adapted to tension the superposed film strips during the interval of travel of the films between said spaced sprockets.

JOHN G. CAPSTAFF.

REFERENCES CITED

The following references are of record in the file of this patent:

UNITED STATES PATENTS

| Number | Name | Date |
| --- | --- | --- |
| 2,093,914 | Janssen | Sept. 21, 1937 |
| 2,286,458 | Bowman et al. | June 16, 1942 |
| 2,289,151 | Teague et al. | July 7, 1942 |
| 2,290,365 | Wynne | July 21, 1942 |
| 2,369,176 | Rackett | Feb. 13, 1945 |
| 2,404,073 | Karfiol et al. | July 16, 1946 |
| 2,415,442 | Rackett | Feb. 11, 1947 |
| 2,417,060 | Capstaff | Mar. 11, 1947 |
| 2,448,691 | Taylor | Sept. 7, 1948 |

FOREIGN PATENTS

| Number | Country | Date |
| --- | --- | --- |
| 582,436 | Great Britain | Nov. 15, 1946 |
| 582,438 | Great Britain | Nov. 15, 1946 |
| 582,439 | Great Britain | Nov. 15, 1946 |